US012372721B2

(12) United States Patent
Kawakami et al.

(10) Patent No.: US 12,372,721 B2
(45) Date of Patent: Jul. 29, 2025

(54) DEPOLARIZER AND OPTICAL AMPLIFIER EXCITATION APPARATUS

(71) Applicant: NIPPON TELEGRAPH AND TELEPHONE CORPORATION, Tokyo (JP)

(72) Inventors: Hiroto Kawakami, Musashino (JP); Shoichiro Kuwahara, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 158 days.

(21) Appl. No.: 18/039,094

(22) PCT Filed: Dec. 1, 2020

(86) PCT No.: PCT/JP2020/044597
§ 371 (c)(1),
(2) Date: May 26, 2023

(87) PCT Pub. No.: WO2022/118361
PCT Pub. Date: Jun. 9, 2022

(65) Prior Publication Data
US 2024/0004132 A1 Jan. 4, 2024

(51) Int. Cl.
*G02B 6/126* (2006.01)
*G02F 1/35* (2006.01)
(52) U.S. Cl.
CPC .............. *G02B 6/126* (2013.01); *G02F 1/35* (2013.01)
(58) Field of Classification Search
CPC .................... G02B 6/126; G02F 1/35–397
See application file for complete search history.

(56) References Cited

U.S. PATENT DOCUMENTS 6,081,355 A     6/2000  Sharma et al.
10,809,460 B2 * 10/2020 Dülk .................... G02B 6/2786
(Continued)

FOREIGN PATENT DOCUMENTS

JP    H09244076 A    9/1997
JP    2003347676 A  12/2003
JP    2013152295 A   8/2013

OTHER PUBLICATIONS

Toshiyuki Tokura et al., "Efficient Pump Depolarizer Analysis for Distributed Raman Amplifier With Low Polarization Dependence of Gain," Journal of Lightwave Technology, vol. 24, No. 11, Nov. 2006.

Primary Examiner — Rhonda S Peace
(74) Attorney, Agent, or Firm — Harness, Dickey & Pierce, P.L.C.

(57) ABSTRACT

A depolarizer for depolarizing input light having a plurality of linearly polarized waves whose optical frequency interval is f includes: an input optical waveguide configured to propagate the input light while maintaining linear polarization; a first polarization-maintaining coupler configured to bifurcate the linearly polarized waves output from the input optical waveguide to a first arm and a second arm while maintaining a polarization state; a second polarization-maintaining coupler configured to polarization-multiplex and output the linearly polarized waves propagated through the first arm and the second arm; and a polarization-maintaining variable optical delay line arranged on at least one of the first arm or the second arm, in which the variable optical delay line is adjusted such that a difference in delay time between the linearly polarized waves propagated through the first arm and the second arm becomes close to $(n+0.5)/f$ where n is an arbitrary integer.

1 Claim, 5 Drawing Sheets

(56) References Cited

U.S. PATENT DOCUMENTS

2003/0086174 A1     5/2003   Wakisaka et al.
2007/0297054 A1   12/2007   Yao et al.
2024/0004132 A1*   1/2024   Kawakami ............. G02B 6/126

* cited by examiner

DEPOLARIZER AND OPTICAL AMPLIFIER EXCITATION APPARATUS

CROSS-REFERENCE TO RELATED APPLICATIONS

This application is a 371 National Stage of International Application No. PCT/JP2020/044597, filed on Dec. 1, 2020. The entire disclosures of the above applications are incorporated herein by reference.

TECHNICAL FIELD

The present invention relates to a depolarizer and an optical amplifier pumping device.

BACKGROUND ART

In designing a high-speed large-capacity optical transmission system, it is important to reduce signal-to-noise (SN) degradation of a received signal caused by a transmission line loss. Therefore, there have been devised various configurations that cause a relay or an optical transmission line itself to perform optical amplification to compensate for the transmission line loss. Among those configurations, an optical amplifier using an erbium-doped fiber as a gain medium has been widely practically used for its simplicity.

Meanwhile, a Raman amplifier using the Raman effect can achieve a wide gain band, and thus adaptation thereof to a wavelength multiplexing transmission system has been actively attempted. In particular, distributed Raman amplification using the optical fiber transmission line itself as a gain medium has a great advantage of using an existing optical fiber as the gain medium, and thus application thereof to next-generation high-speed large-capacity optical communication is expected.

FIG. 3 illustrates a configuration of a conventional optical transmission system using the distributed Raman amplification. An optical transmission system 1000 using the distributed Raman amplification in FIG. 3 includes an optical transmitter 100, an optical receiver 200, a forward pumping unit 300, and a backward pumping unit 400. The optical transmitter 100 and the optical receiver 200 are connected via an optical transmission line 500. Bidirectional pumping is assumed in the optical transmission system 1000. Therefore, in the optical transmission line 500 of the optical transmission system in FIG. 3, forward pumping is performed by pumping light output from the forward pumping unit 300, and backward pumping is performed by pumping light output from the backward pumping unit 400. An optical signal is transmitted from the optical transmitter 100.

In Raman amplification, a wavelength of pumping light is shorter than a wavelength of an optical signal by about 0.1 μm. The pumping light, as well as the optical signal, is normally propagated through a core of the optical transmission line 500. Thus, the forward pumping unit 300 needs to multiplex pumping light traveling in the same direction as an optical signal with the optical signal.

Meanwhile, the backward pumping unit 400 needs to transmit pumping light traveling in a direction opposite to the optical signal, and transmit only the optical signal to the optical receiver 200 after demultiplexing. Those multiplexing and demultiplexing can be achieved by a wavelength multiplexing coupler or a circulator. Although bidirectional pumping has been described in FIG. 3, a pumping direction may be only forward or backward.

A gain of the Raman amplification is determined based on a light intensity of pumping light output from a pumping light source. Therefore, in order to finely adjust the gain, it is only necessary to finely adjust the light intensity of the pumping light. A semiconductor laser is normally used as the pumping light source, and the light intensity is adjusted by adjusting a pumping current. Another factor that determines the gain of the Raman amplification is polarization of the pumping light. The Raman amplification is an optical effect having polarization dependence, and thus, in a case where the pumping light is a single polarized wave, a gain received by an optical signal causes polarization dependence. That is, the gain changes depending on a state of polarization at the time when the optical signal enters the optical transmission line 500, and thus light intensity of the amplified optical signal changes. This fluctuation range of the gain is referred to as polarization dependent gain (PDG). The PDG appears particularly remarkably in a configuration having only forward pumping. In backward pumping, polarization fluctuation is greatly different in the optical transmission line due to a difference in traveling direction between the optical signal and the pumping light, and thus the PDG is smaller than that in forward pumping. However, some means is required to completely suppress the PDG.

In order to suppress the PDG, depolarizing output of the pumping light source by using a depolarizer is widely performed. FIG. 4 illustrates an example of the forward pumping unit 300 including a depolarizer. The forward pumping unit 300 includes a pumping light source 310, a depolarizer 320, a pumping light optical waveguide 330, an optical signal optical waveguide 340, a pumping light coupling unit 350, and a pumping light output port 360. The pumping light source 310 outputs pumping light. A laser is normally used as the pumping light source 310, and thus the pumping light output from the pumping light source 310 is a linearly polarized wave.

The pumping light output from the pumping light source 310 is depolarized by the depolarizer 320. The depolarized pumping light propagates through the pumping light optical waveguide 330 and is input to the pumping light coupling unit 350. An optical signal input to the forward pumping unit 300 propagates through the optical signal optical waveguide 340 and is input to the pumping light coupling unit 350. The pumping light coupling unit 350 multiplexes the pumping light with the input optical signal. The multiplexed signal is output from the pumping light output port 360 and is transmitted to the optical transmission line 500 also serving as a gain medium.

There is a plurality of configurations for the depolarizer 320, and a Lyot depolarizer has been known for a long time. FIG. 5 illustrates a configuration of a conventional Lyot depolarizer 370. FIG. 5 also illustrates the pumping light source 310 connected to the Lyot depolarizer 370. Pumping light output from the pumping light source 310 propagates through a pumping-light input optical waveguide 380 and is input to the Lyot depolarizer 370. Here, the pumping-light input optical waveguide 380 is a polarization-maintaining fiber such as a PANDA fiber, and the pumping light is input to the Lyot depolarizer 370 while maintaining linear polarization. The Lyot depolarizer 370 includes a delay line 371 as a component. The delay line 371 is a polarization-maintaining fiber such as a PANDA fiber. The pumping-light input optical waveguide 380 and the delay line 371 are connected via a fusion point 390. Here, slow axes oriented through the stress applying parts of both the pumping-light input optical waveguide 380 and the delay line 371 are fused while being inclined by 45 degrees to each other.

Differential group delay (DGD) is given to the pumping light due to a difference in propagation speed between a fast axis and the slow axis in the delay line 371. It should be noted that, although the delay line 371 is a polarization-maintaining fiber, a linearly polarized wave having a polarization plane inclined with respect to the slow axis is input, and thus a polarization state of the pumping light rapidly changes while the pumping light propagating through the delay line 371. In a case where the delay line 371 has an appropriate length, the pumping light is depolarized by the DGD and is output from the pumping light optical waveguide 330. Here, how to select the length of the delay line 371 is a problem. If the delay line 371 has an uniform material, the DGD is proportional to the length, and the DGD per meter is about 1 to 2 psec. A larger DGD is advantageous for depolarization, and thus, theoretically, the longer the delay line 371 is, the better it is. However, the length of the delay line cannot be unlimitedly increased in practice, and thus some criterion is required.

In a case where the pumping light source 310 is a single mode laser oscillating at a single wavelength, one criterion is to make the DGD of the delay line 371 longer than coherence time of the pumping light. However, a multi-mode laser oscillating at multiple wavelengths is generally used as the pumping light source for the Raman amplification. In a case where the pumping light source 310 is a multi-mode laser, it is known that efficiency of depolarization has periodicity with respect to the DGD (see, for example, Non Patent Literature 1). In a case where a frequency interval in each longitudinal mode of output from the multi-mode laser is f Hz and n is an integer, depolarization is optimized when the DGD of the delay line 371 is $(n+0.5)/f$ seconds. For example, in a case where f is 40 GHz, the DGD for optimizing depolarization has a period of 25 psec.

CITATION LIST

Non Patent Literature

Non Patent Literature 1: Toshiyuki Tokura, Taichi Kogure, Takashi Sugihara, Katsuhiro Shimizu, Takashi Mizuochi, and Kuniaki Motoshima, "Efficient Pump Depolarizer Analysis for Distributed Raman Amplifier With Low Polarization Dependence of Gain", Vol. 24, PP. 3889-3896, 2006.

SUMMARY OF INVENTION

Technical Problem

However, the conventional configuration in FIG. 5 has the following problems. The frequency interval f in each longitudinal mode of the multi-mode laser is not always constant and slightly changes due to a pumping current of the laser. Therefore, when the light intensity is adjusted by changing the pumping current of the pumping light source in order to finely adjust the Raman gain, the frequency interval f also slightly changes. For optimal depolarization, it is necessary to change the length of the delay line 371 depending on such a change in the frequency interval f.

A specific example of how to change the delay line 371 in a case of the Lyot depolarizer in FIG. 5 will be described below. For the sake of simplicity, the DGD of the delay line 371 is assumed to be 1 psec per meter, and, in a case where the frequency interval f is 40 GHz, the length of the delay line 371 may be selected from 12.5 m, 37.5 m, 62.5 m . . . . However, in a case where the frequency interval f changes to 41 GHz, the length of the delay line 371 needs to be changed to 12.2 m, 36.6 m, 61.0 m . . . . Thus, it is necessary to perform difficult work of replacing the delay line and fusing the delay line again. Further, using the delay line of 10 m or more increases a size of the device.

In the above description, the example of depolarizing the pumping multi-mode laser in the optical transmission system using the Raman amplification has been described. However, a similar problem occurs also in a case of using the depolarizer for a purpose other than the Raman amplification.

In view of the above circumstances, an object of the present invention is to provide a technique capable of easily depolarizing output light of a multi-mode laser, regardless of a frequency interval in each longitudinal mode.

Solution to Problem

One aspect of the present invention is a depolarizer for depolarizing input light having a plurality of linearly polarized waves whose optical frequency interval is f, the depolarizer including: an input optical waveguide that propagates the input light while maintaining linear polarization; a first polarization-maintaining coupler that bifurcates the linearly polarized waves output from the input optical waveguide to a first arm and a second arm while maintaining a polarization state; a second polarization-maintaining coupler that polarization-multiplexes and outputs the linearly polarized waves propagated through the first arm and the second arm; and a polarization-maintaining variable optical delay line arranged on at least one of the first arm or the second arm, in which the variable optical delay line is adjusted such that a difference in delay time between the linearly polarized waves propagated through the first arm and the second arm becomes close to $(n+0.5)/f$ where n is an arbitrary integer.

One aspect of the present invention is a depolarizer for depolarizing first input light having a plurality of linearly polarized waves whose optical frequency interval is f1 and second input light having a plurality of linearly polarized waves whose optical frequency interval is f2 (including f2=f1), the depolarizer including: a first input optical waveguide that propagates the first input light while maintaining linear polarization; a second input optical waveguide that propagates the second input light while maintaining linear polarization; a two-input two-output polarization-maintaining coupler that combines the first and second input light having the linearly polarized waves output from the first and second input optical waveguides and bifurcates the combined first and second input light to the first arm and the second arm while maintaining polarization states; a second polarization-maintaining coupler that polarization-multiplexes and outputs the first input light having the linearly polarized waves propagated through the first arm and the second arm and also polarization-multiplexes and outputs the second input light having the linearly polarized waves propagated through the first arm and the second arm; and a polarization-maintaining variable optical delay line arranged on at least one of the first arm or the second arm, in which the variable optical delay line is adjusted such that a difference in delay time between the linearly polarized waves propagated through the first arm and the second arm becomes close to $(n1+0.5)/f1=(n2+0.5)/f2$ where n1 and n2 are integers (including n2=n1) satisfying $(n1+0.5)/f1=(n2+0.5)/f2$.

One aspect of the present invention is a depolarizer for depolarizing input light having a plurality of linearly polarized waves whose optical frequency interval is f, the depolarizer including: an input optical waveguide that propagates the input light while maintaining linear polarization; a first polarization-maintaining coupler that bifurcates the linearly polarized waves output from the input optical waveguide to a first arm and a second arm while maintaining a polarization state; a second polarization-maintaining coupler that polarization-multiplexes and outputs the linearly polarized waves propagated through the first arm and the second arm; and a polarization-maintaining optical power adjustment unit arranged on at least one of the first arm, the second arm, or the input optical waveguide, in which the optical power adjustment unit is capable of adjusting optical power without changing the optical frequency interval f.

One aspect of the present invention is a depolarizer for depolarizing first input light having a plurality of linearly polarized waves whose optical frequency interval is f1 and second input light having a plurality of linearly polarized waves whose optical frequency interval is f2 (including f2=f1), the depolarizer including: a first input optical waveguide that propagates the first input light while maintaining linear polarization; a second input optical waveguide that propagates the second input light while maintaining linear polarization; a two-input two-output polarization-maintaining coupler that combines the first and second input light having the linearly polarized waves output from the first and second input optical waveguides and bifurcates the combined first and second input light to the first arm and the second arm while maintaining polarization states; a second polarization-maintaining coupler that polarization-multiplexes and outputs the first input light having the linearly polarized waves propagated through the first arm and the second arm and also polarization-multiplexes and outputs the second input light having the linearly polarized waves propagated through the first arm and the second arm; and a polarization-maintaining optical power adjustment unit arranged on at least one of the first arm, the second arm, the first input optical waveguide, or the second input optical waveguide, in which the optical power adjustment unit is capable of adjusting optical power without changing the optical frequency intervals f1 and f2.

One aspect of the present invention is an optical amplifier pumping device for pumping an optical amplifier after depolarizing an output of a multi-mode laser whose optical frequency interval in each longitudinal mode is f, the optical amplifier pumping device including: an input optical waveguide that propagates the input output of the multi-mode laser while maintaining linear polarization; a first polarization-maintaining coupler that bifurcates linearly polarized waves output from the input optical waveguide to a first arm and a second arm while maintaining a polarization state; a second polarization-maintaining coupler that polarization-multiplexes and outputs the linearly polarized waves propagated through the first arm and the second arm; a pumping light output unit that pumps a gain medium of the optical amplifier by using the output of the second polarization-maintaining coupler as pumping light; and a polarization-maintaining variable optical delay line arranged on at least one of the first arm or the second arm, in which: the variable optical delay line is adjusted such that a difference in delay time between the linearly polarized waves propagated through the first arm and the second arm becomes close to $(n+0.5)/f$ where n is an arbitrary integer; and all optical power in a plurality of longitudinal modes of output light of the multi-mode laser does not exceed twice a threshold of occurrence of stimulated Brillouin scattering in the gain medium.

One aspect of the present invention is an optical amplifier pumping device for pumping an optical amplifier after depolarizing an output of a first multi-mode laser whose optical frequency interval is f1 and an output of a second multi-mode laser whose optical frequency interval is f2 (including f2=f1), the optical amplifier pumping device including: a first input optical waveguide that propagates the input output of the first multi-mode laser while maintaining linear polarization; a second input optical waveguide that propagates the input output of the second multi-mode laser while maintaining linear polarization; a two-input two-output polarization-maintaining coupler that combines the outputs of the first and second multi-mode lasers having linearly polarized waves output from the first and second input optical waveguides and bifurcates the combined outputs to a first arm and a second arm while maintaining polarization states; a second polarization-maintaining coupler that polarization-multiplexes and outputs the output of the first multi-mode laser having the linearly polarized waves propagated through the first arm and the second arm and also polarization-multiplexes and outputs the output of the second multi-mode laser having the linearly polarized waves propagated through the first arm and the second arm; a pumping light output unit that pumps a gain medium of the optical amplifier by using the outputs of the second polarization-maintaining coupler as pumping light; and a polarization-maintaining variable optical delay line arranged on at least one of the first arm or the second arm, in which: the variable optical delay line is adjusted such that a difference in delay time between the linearly polarized waves propagated through the first arm and the second arm becomes close to $(n1+0.5)/f1-(n2+0.5)/f2$ where n1 and n2 are integers (including n2=n1) satisfying $(n1+0.5)/f1=(n2+0.5)/f2$; and all optical power in a plurality of longitudinal modes of output light of the first and second multi-mode lasers does not exceed twice a threshold of occurrence of stimulated Brillouin scattering in the gain medium.

One aspect of the present invention is an optical amplifier pumping device for pumping an optical amplifier after depolarizing an output of a multi-mode laser whose optical frequency interval in each longitudinal mode is f, the optical amplifier pumping device including: an input optical waveguide that propagates the input output of the multi-mode laser while maintaining linear polarization; a first polarization-maintaining coupler that bifurcates linearly polarized waves output from the input optical waveguide to a first arm and a second arm while maintaining a polarization state; a second polarization-maintaining coupler that polarization-multiplexes and outputs the linearly polarized waves propagated through the first arm and the second arm; a pumping light output unit that pumps a gain medium of the optical amplifier by using the output of the second polarization-maintaining coupler as pumping light; and a polarization-maintaining optical power adjustment unit arranged on at least one of the first arm, the second arm, or the input optical waveguide, in which: the optical power adjustment unit is capable of adjusting optical power without changing the optical frequency interval f in each longitudinal mode; and all the optical power in the plurality of longitudinal modes of output light of the multi-mode laser does not exceed twice a threshold of occurrence of stimulated Brillouin scattering in the gain medium.

One aspect of the present invention is an optical amplifier pumping device for pumping an optical amplifier after depolarizing an output of a first multi-mode laser whose optical frequency interval is f1 and an output of a second multi-mode laser whose optical frequency interval is f2

(including f2=f1), the optical amplifier pumping device including: a first input optical waveguide that propagates the input output of the first multi-mode laser while maintaining linear polarization; a second input optical waveguide that propagates the input output of the second multi-mode laser while maintaining linear polarization; a two-input two-output polarization-maintaining coupler that combines the outputs of the first and second multi-mode lasers having linearly polarized waves output from the first and second input optical waveguides and bifurcates the combined outputs to a first arm and a second arm while maintaining polarization states; a second polarization-maintaining coupler that polarization-multiplexes and outputs the output of the first multi-mode laser having the linearly polarized waves propagated through the first arm and the second arm and also polarization-multiplexes and outputs the output of the second multi-mode laser having the linearly polarized waves propagated through the first arm and the second arm; a pumping light output unit that pumps a gain medium of the optical amplifier by using the outputs of the second polarization-maintaining coupler as pumping light; and a polarization-maintaining optical power adjustment unit arranged on at least one of the first arm, the second arm, the first input optical waveguide, or the second input optical waveguide, in which: the optical power adjustment unit is capable of adjusting optical power without changing the optical frequency intervals f1 and f2 in longitudinal modes; and all the optical power in the plurality of longitudinal modes of output light of the first and second multi-mode lasers does not exceed twice a threshold of occurrence of stimulated Brillouin scattering in the gain medium.

Advantageous Effects of Invention

According to the present invention, it is possible to easily depolarize output light of a multi-mode laser, regardless of a frequency interval in each longitudinal mode.

DESCRIPTION OF EMBODIMENTS

Hereinafter, embodiments of the present invention will be described with reference to the drawings.

Figure 3:
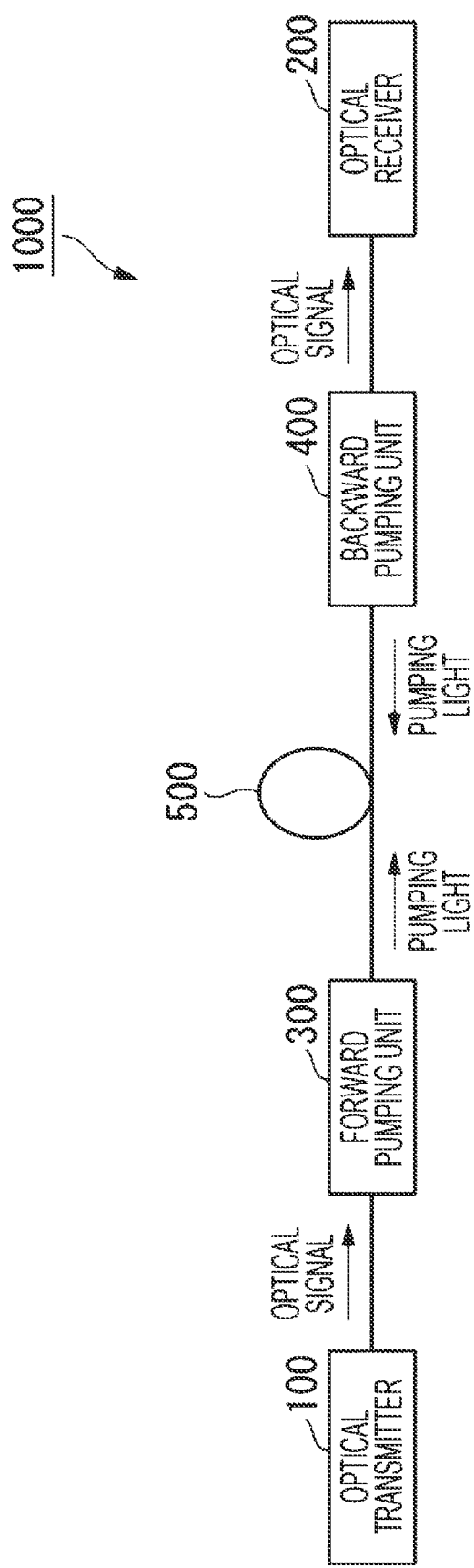
FIG. 3 illustrates a configuration of a conventional optical transmission system using the distributed Raman amplification.

A depolarizer described below is used in, for example, the optical transmission system 1000 in FIG. 3.

Figure 4:
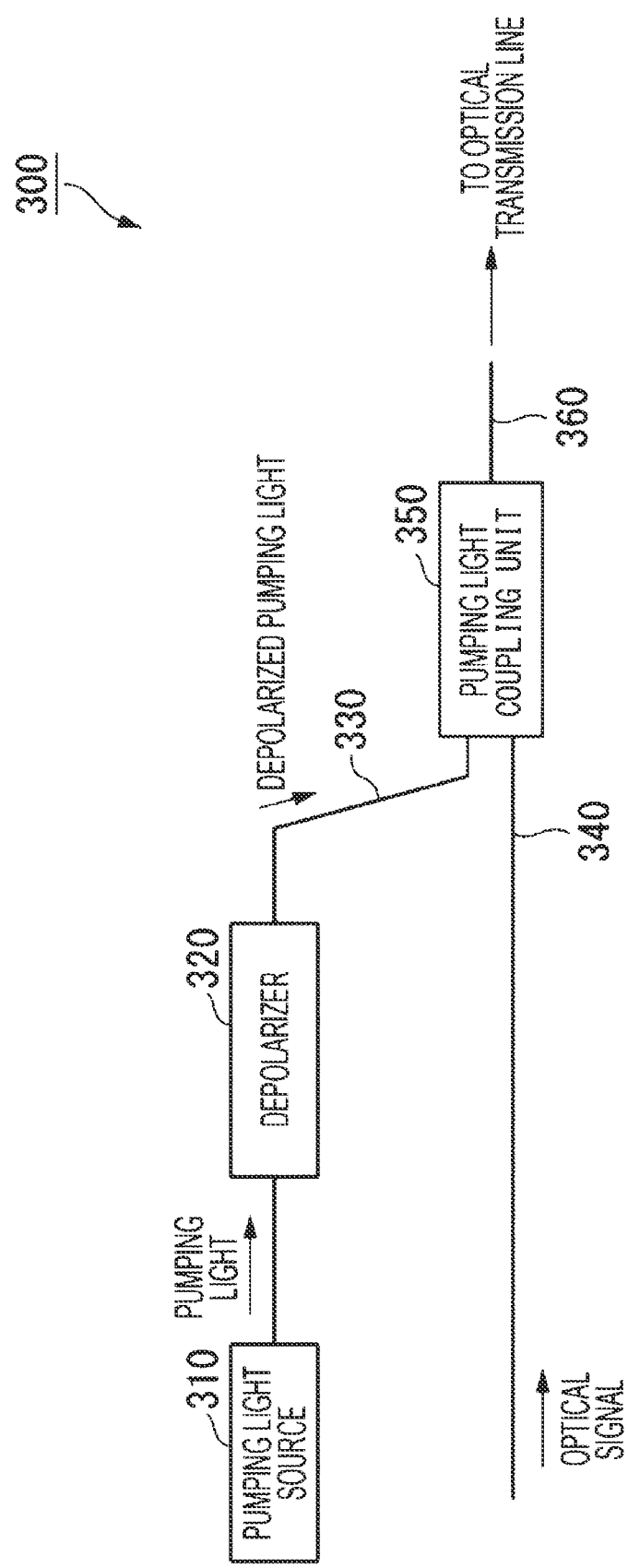
FIG. 4 illustrates an example of a conventional forward pumping unit including a depolarizer.

For example, the depolarizer described below is used instead of the depolarizer 320 in FIG. 4. Therefore, description of a basic system configuration will be omitted, and the depolarizer that is a feature of the present invention will be described.

First Embodiment

Figure 1:
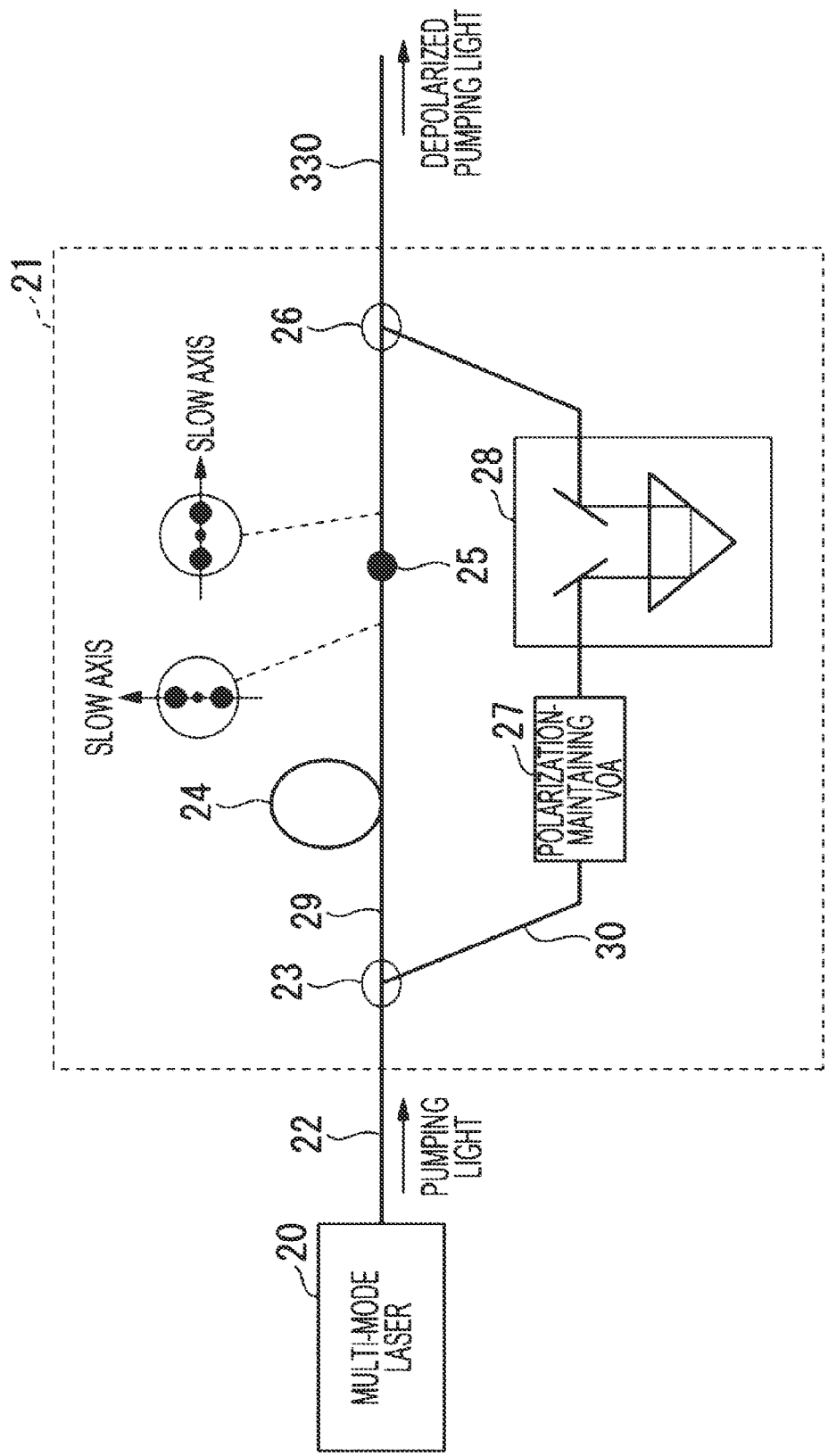
FIG. 1 illustrates a configuration of a depolarizer in a first embodiment.

FIG. 1 illustrates a configuration of a depolarizer 21 in a first embodiment. FIG. 1 also illustrates a multi-mode laser 20 connected to the depolarizer 21. The multi-mode laser 20 is a laser that oscillates at multiple wavelengths. In the following description, a frequency interval in each longitudinal mode of pumping light output from the multi-mode laser 20 is set to f. The pumping light propagates through a pumping-light input optical waveguide 22 and is input to the depolarizer 21. The pumping-light input optical waveguide 22 is a polarization-maintaining optical waveguide, and the pumping light maintains linear polarization.

The depolarizer 21 depolarizes multi-wavelength pumping light output from the multi-mode laser 20. The depolarizer 21 is a two-armed depolarizer. Hereinafter, the depolarizer 21 will be described as a two-armed depolarizer 21. A configuration of the two-armed depolarizer 21 is improved by adding a new element to a depolarizer shown in Reference Literature 1 below.
(Reference Literature 1: Japanese Patent No. 5788814)

The two-armed depolarizer 21 includes a first polarization-maintaining coupler 23, a delay line 24, an orthogonal connector 25, a second polarization-maintaining coupler 26, a polarization-maintaining variable optical attenuator (VOA) 27, and a polarization-maintaining variable optical delay line 28.

The first polarization-maintaining coupler 23 bifurcates input pumping light. The pumping light bifurcated by the first polarization-maintaining coupler 23 is input to a first arm 29 and a second arm 30. A bifurcation ratio of the first polarization-maintaining coupler 23 is desirably 1:1, but is not necessarily limited to this bifurcation ratio.

Figure 5:
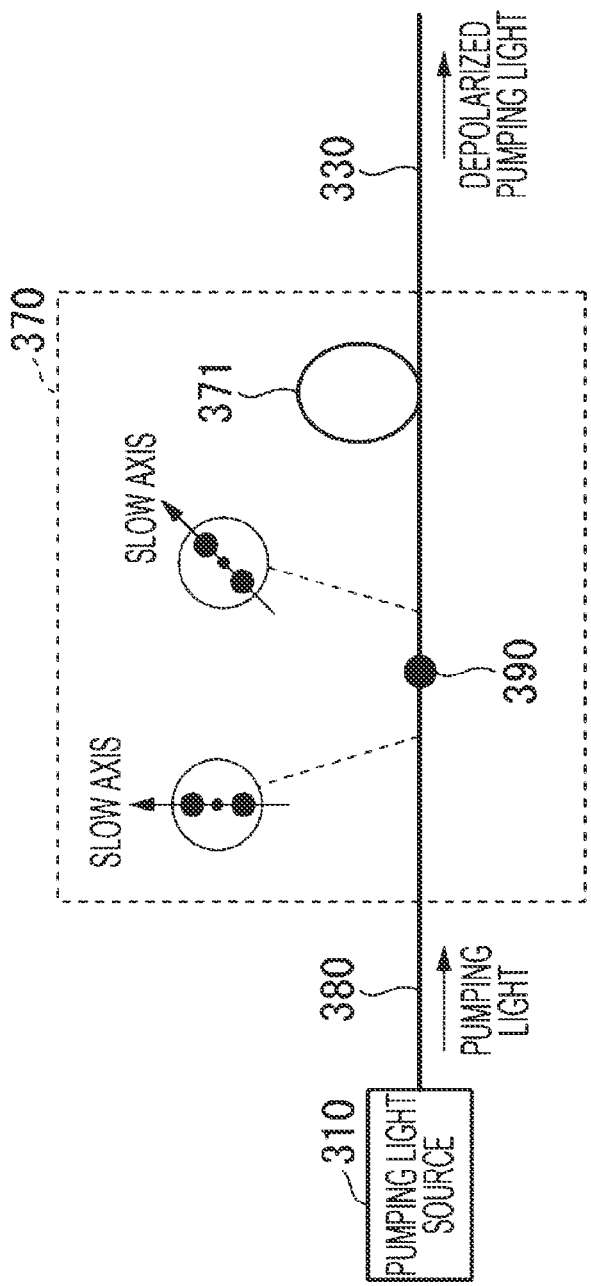
FIG. 5 illustrates a configuration of a conventional Lyot depolarizer.

The pumping light propagating through the first arm 29 is input to a delay line 24. The delay line 24 delays the input pumping light. The delay line 24 is a polarization-maintaining fiber such as a PANDA fiber, and a polarization plane of the pumping light is input so as to coincide with a slow axis of the delay line 24. Therefore, unlike the Lyot depolarizer in FIG. 5, the pumping light maintains linear polarization while propagating through the delay line 24. The polarization plane of the linearly polarized wave is changed from the slow axis to a fast axis by the orthogonal connector 25.

Meanwhile, the pumping light propagating through the second arm 30 is input to the polarization-maintaining VOA 27, is then input to the polarization-maintaining variable optical delay line 28, and is output from the polarization-maintaining variable optical delay line 28 while maintaining linear polarization. The polarization-maintaining variable optical delay line 28 gives a delay to the input pumping light. The polarization-maintaining variable optical delay line 28 is an optical component capable of adjusting a delay time by variably controlling a propagation distance. The polarization-maintaining VOA 27 and the polarization-maintaining variable optical delay line 28, as well as the delay line 24, maintain polarization. However, unlike the delay line 371 in the Lyot depolarizer, the optical components such as the polarization-maintaining VOA 27 and the polarization-maintaining variable optical delay line 28 have no problem even in a case where the DGD is zero.

Both the pumping light passed through the orthogonal connector 25 and the pumping light output from the polarization-maintaining variable optical delay line 28 are linearly polarized waves, are polarization-multiplexed by the second polarization-maintaining coupler 26, and are output from the pumping light optical waveguide 330.

An optical loss of the polarization-maintaining VOA 27 is set such that the two linearly polarized waves to be polarization-multiplexed by the second polarization-maintaining coupler 26 have the same optical power. Even in a case where optical losses of the delay line 24 and other components cannot be negligible or in a case where the bifurcation ratio of the first polarization-maintaining coupler 23 is not 1:1, the optical power of the two linearly polarized waves to be polarization-multiplexed can be always kept the same by the polarization-maintaining VOA 27.

When the optical loss of the polarization-maintaining variable optical delay line 28 is larger than that of the delay line 24, the polarization-maintaining VOA 27 may be provided in the first arm 29. Although the Lyot depolarizer in FIG. 5 generates the DGD between the fast axis and the slow axis of the delay line 24, the two-armed depolarizer 21 generates the DGD on the basis of a difference in propagation delay between the first arm 29 and the second arm 30. The propagation delay of the first arm 29 is determined based on the length of the delay line 24, and the delay is about 5 nanoseconds (nsec) per meter. This is 5,000 times the DGD of the delay line 24 alone. Therefore, the delay line 24 can be greatly shortened as compared with the Lyot depolarizer.

The propagation delay of the second arm 30 can be finely adjusted by the polarization-maintaining variable optical delay line 28. The polarization-maintaining variable optical delay line 28 has various configurations. Typical configuration has a space system including a mirrors and a movable optical prism. The delay time is changed by changing a position of the optical prism to change a round-trip distance to the mirrors. When the round-trip distance increases by 1 mm, the delay time increases by about 3 psec.

In a case where a frequency interval in each longitudinal mode of output of the multi-mode laser 20 is f Hz and n is an integer, depolarization is optimized when the DGD caused by the difference in propagation delay between the first arm 29 and the second arm 30 is (n+0.5)/f seconds.

For example, in a case where the frequency interval f is 40 GHz, the DGD for optimizing depolarization has a period of 25 psec. In this case, even though the length of the delay line 24 is fixed, at least one optimal DGD can be selected if a variable range of the delay time of the polarization-maintaining variable optical delay line 28 is 25 psec or more. Changing the delay time by 25 psec in the polarization-maintaining variable optical delay line 28 corresponds to changing the round-trip distance by 8 to 9 mm, and this can be easily achieved by using a commercially available simple polarization-maintaining variable optical delay line 28.

According to the two-armed depolarizer 21 configured as described above in the first embodiment, it is possible to easily depolarize output light of the multi-mode laser regardless of the frequency interval in each longitudinal mode by adjusting the polarization-maintaining variable optical delay line 28 such that a difference in delay time between the linearly polarized waves propagating through the first arm 29 and the second arm 30 becomes close to (n+0.5)/f. In particular, in a case where the two-armed depolarizer 21 is used for pumping light of the distributed Raman amplification, a stable Raman gain can be achieved, which is a remarkable effect.

Second Embodiment

In the first embodiment, output of a single multi-mode laser is depolarized. In the Raman amplification, it is desirable to use pumping light sources having a different wavelengths in order to smooth a gain band and finely adjust a light output intensity of each pumping light source in order to finely adjust the Raman gain. In view of this, in a second embodiment, polarization-maintaining VOAs are arranged between a two-armed depolarizer having two input terminals and two multi-mode lasers. This makes it possible to finely adjust the light output intensity.

Figure 2:
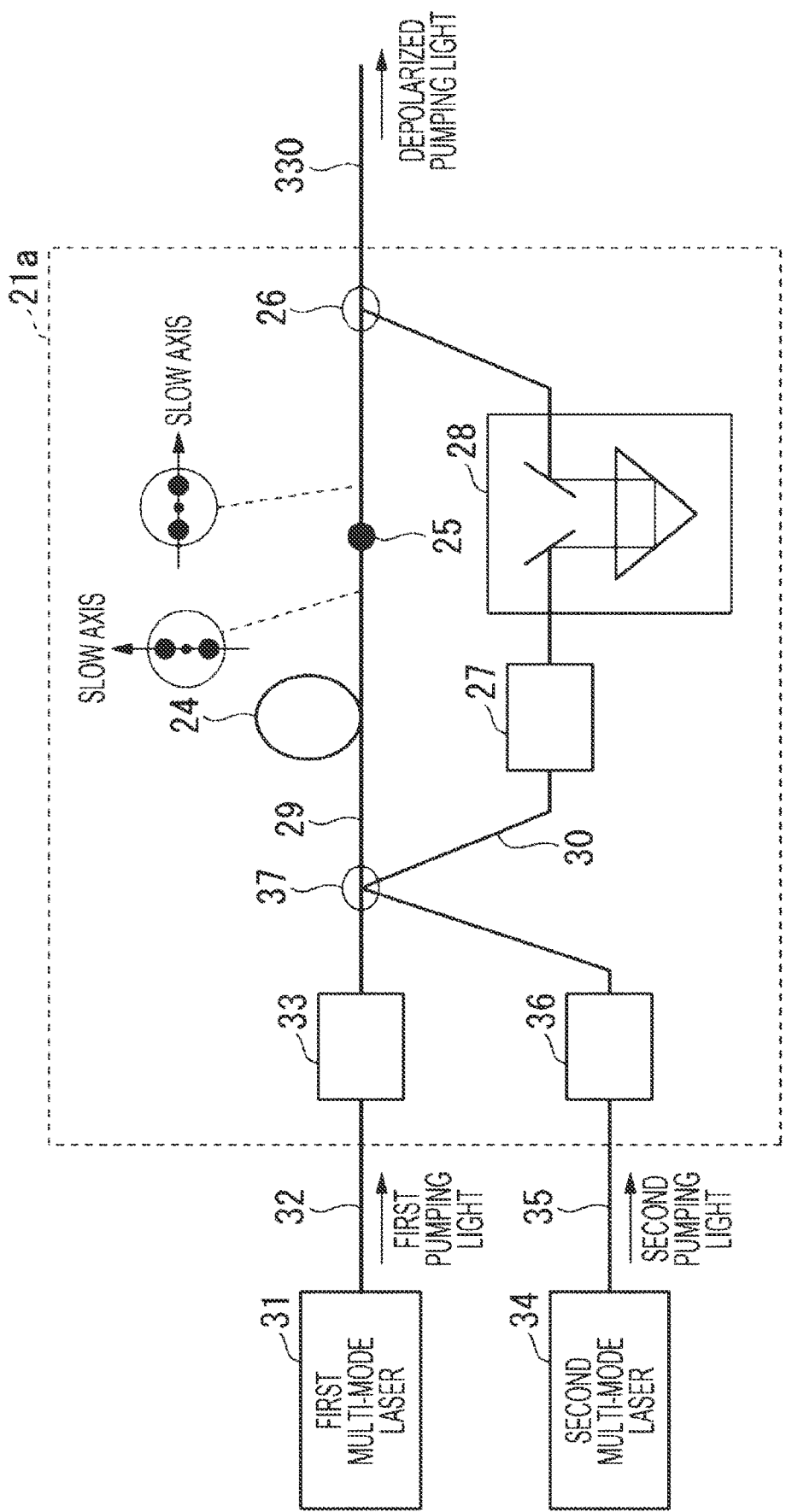
FIG. 2 illustrates a configuration of a depolarizer in a second embodiment.

FIG. 2 illustrates a configuration of a depolarizer 21a in the second embodiment. FIG. 2 also illustrates two multi-mode lasers (a first multi-mode laser 31 and a second multi-mode laser 34) connected to the depolarizer 21a. First pumping light output from the first multi-mode laser 31 propagates through a first pumping light optical waveguide 32 and is input to the depolarizer 21a. Second pumping light output from the second multi-mode laser 34 propagates through a second pumping light optical waveguide 35 and is input to the depolarizer 21a. The first pumping light optical waveguide 32 and the second pumping light optical waveguide 35 are polarization-maintaining optical waveguides, and the first pumping light and the second pumping light maintain linear polarization.

The depolarizer 21a depolarizes the pumping light (first pumping light and second pumping light) output from both the first multi-mode laser 31 and the second multi-mode laser 34. The depolarizer 21a is a two-input two-armed depolarizer. Hereinafter, the depolarizer 21a will be described as a two-input two-armed depolarizer 21a.

The two-input two-armed depolarizer 21a includes a delay line 24, an orthogonal connector 25, a second polarization-maintaining coupler 26, a polarization-maintaining VOA 27, a polarization-maintaining variable optical delay line 28, a first pumping light polarization-maintaining VOA 33, a second pumping light polarization-maintaining VOA 36, and a two-input two-output polarization-maintaining coupler 37.

The two-input two-armed depolarizer 21a is different from the two-armed depolarizer 21 in the first embodiment in that the two-input two-armed depolarizer includes the two-input two-output polarization-maintaining coupler 37 instead of the first polarization-maintaining coupler 23 and newly includes the first pumping light polarization-maintaining VOA 33 and the second pumping light polarization-maintaining VOA 36.

The first pumping light polarization-maintaining VOA 33 is arranged between one (e.g. a first input port) of two input ports of the two-input two-output polarization-maintaining coupler 37 and the first pumping light optical waveguide 32. The second pumping light polarization-maintaining VOA 36 is arranged between the other one (e.g. a second input port) of the two input ports of the two-input two-output polarization-maintaining coupler 37 and the second pumping light optical waveguide 35.

Both the first pumping light and the second pumping light are input to the two-input two-armed depolarizer 21a as linearly polarized waves. The first pumping light and the second pumping light both have a frequency interval of f Hz in each longitudinal mode. In a case where the frequency intervals in the longitudinal modes of outputs of the first multi-mode laser 31 and the second multi-mode laser 34 are f Hz and n is an integer, depolarization is optimized when the DGD caused by the difference in propagation delay between the first arm 29 and the second arm 30 is (n+0.5)/f seconds, as in the first embodiment.

The first pumping light and the second pumping light have different wavelengths so as to avoid mutual interference in the two-input two-armed depolarizer 21a. Alternatively, polarization planes may be set such that the first pumping light and the second pumping light are orthogonal to each other in polarization in the first arm 29 and the second arm 30.

A gain profile of the Raman gain can be finely adjusted by finely adjusting light intensities of the first pumping light and the second pumping light. At this time, however, the light intensities are finely adjusted by finely adjusting losses of the first pumping light polarization-maintaining VOA 33 and the second pumping light polarization-maintaining VOA 36, instead of finely adjusting pumping currents of the first multi-mode laser 31 and the second multi-mode laser 34 as in the conventional configuration. By adopting such a configuration, it is possible to finely adjust the light intensities while the frequency intervals f of the pumping light are kept constant, and it is unnecessary to change a setting of the polarization-maintaining variable optical delay line 28 again.

In order to adjust the light intensities of the first pumping light and the second pumping light, it is necessary to be careful so that optical power in the plurality of longitudinal modes of the first and second pumping light does not cause a nonlinear optical effect in a Raman gain medium. The each longitudinal mode of the outputs of the multi-mode lasers is individually CW light having a narrow line width. In the Raman amplification, the gain medium is normally an optical fiber having a length of several kilometers. However, in a case where the CW light having the narrow line width is input to the optical fiber, pumping light causes stimulated Brillouin scattering when input power exceeds a certain threshold, and stable amplification cannot be performed. Thus, optical power of each longitudinal mode included in output light from the first multi-mode laser 31 and the second multi-mode laser 34 should not exceed twice a threshold power of the stimulated Brillouin scattering in the gain medium. Here, the reason for a factor of twice is that each longitudinal mode is polarization-multiplexed with the longitudinal mode itself in the two-input two-armed depolarizer 21a to halve the optical power viewed on a single polarization plane.

According to the two-input two-armed depolarizer 21a configured as described above in the second embodiment, it is possible to easily depolarize output light of the plurality of multi-mode lasers regardless of the frequency interval in each longitudinal mode by adjusting the polarization-maintaining variable optical delay line 28 such that an arbitrary integer is set to n and the difference in delay time becomes close to $(n+0.5)/f$ seconds. In particular, in a case where the two-input two-armed depolarizer 21a is used for pumping light of the distributed Raman amplification, a stable Raman gain can be achieved, which is a remarkable effect.

Variations of Second Embodiment

In the second embodiment, the frequency intervals in the longitudinal modes of the first pumping light and the second pumping light are both f Hz. However, the frequency interval in each longitudinal mode of the first pumping light may be set to f1 Hz, and the frequency interval in each longitudinal mode of the second pumping light may be set to f2 Hz. However, in this case, in order to optimize depolarization, the DGD caused by the difference in propagation delay between the first arm 29 and the second arm 30 needs to satisfy $(n1+0.5)/f1=(n2+0.5)/f2$ seconds. Here, both n1 and n2 are integers.

Variations of Embodiments

In each embodiment, the pumping light propagating through the first arm 29 and the pumping light propagating through the second arm 30 are polarization-multiplexed by using the orthogonal connector 25 and the second polarization-maintaining coupler 26. However, polarization multiplexing may be performed by using a polarization beam combiner (PBC), instead of the orthogonal connector 25 and the second polarization-maintaining coupler 26.

In each of the above embodiments, the PANDA fiber is used as the delay line 24, but any optical waveguide may be used instead of the PANDA fiber as long as the optical waveguide can maintain linear polarization.

In each embodiment, the polarization-maintaining variable optical delay line 28 is provided as a component, but the polarization-maintaining variable optical delay line 28 can be omitted as long as optical path lengths of the first arm 29, the second arm 30, and the delay line 24 can be accurately created. In that case, it is necessary to accurately adjust a pumping current and temperature of each multi-mode laser so that the difference in delay time between the first arm 29 and the second arm 30 maintains $(n+0.5)/f$ or $(n1+0.5)/f1=(n2+0.5)/f2$. In a case where power of the pumping light is adjusted after the pumping current and the temperature are determined, it is necessary to perform control so as not to change f1 and f2 by using the first pumping light polarization-maintaining VOA 33 and the second pumping light polarization-maintaining VOA 36.

There has been described the examples where the two-armed depolarizer 21 and the two-input two-armed depolarizer 21a in the embodiments depolarize the pumping multi-mode laser in the optical transmission system using the Raman amplification. However, the same applies to a case of using the depolarizer for a purpose other than the Raman amplification.

The two-armed depolarizer 21 and the two-input two-armed depolarizer 21a in the embodiments are an aspect of an optical amplifier pumping device for pumping an optical amplifier. The two-armed depolarizer 21 and the two-input two-armed depolarizer 21a in the embodiments further include a pumping light output unit that pumps a gain medium (e.g. optical transmission line) of the optical amplifier by using output of the second polarization-maintaining coupler 26 as pumping light.

Hereinabove, the embodiments of the present invention have been described in detail with reference to the drawings. However, the specific configuration is not limited to the embodiments and includes design and the like without departing from the spirit of the present invention.

INDUSTRIAL APPLICABILITY

The present invention is applicable to an optical transmission system including a depolarizer.

REFERENCE SIGNS LIST

20 Multi-mode laser
21 Two-armed depolarizer
21a Two-input two-armed depolarizer
22 Pumping-light input optical waveguide (input optical waveguide)
23 First polarization-maintaining coupler
24 Delay line
25 Orthogonal connector
26 Second polarization-maintaining coupler
27 Polarization-maintaining VOA (optical power adjustment unit)
28 Polarization-maintaining variable optical delay line
29 First arm
30 Second arm
31 First multi-mode laser 32 First pumping light optical waveguide (first input optical waveguide)
33 First pumping light polarization-maintaining VOA
34 Second multi-mode laser
35 Second pumping light optical waveguide (second input optical waveguide)
36 Second pumping light polarization-maintaining VOA
37 Two-input two-output polarization-maintaining coupler

The invention claimed is:

1. A depolarizer for depolarizing input light having a plurality of linearly polarized waves whose optical frequency interval is f, the depolarizer comprising:
 an input optical waveguide configured to propagate the input light while maintaining linear polarization;
 a first polarization-maintaining coupler configured to bifurcate the linearly polarized waves output from the input optical waveguide to a first arm and a second arm while maintaining a polarization state;
 a second polarization-maintaining coupler configured to polarization-multiplex and output the linearly polarized waves propagated through the first arm and the second arm; and
 a polarization-maintaining variable optical delay line arranged on at least one of the first arm or the second arm, wherein
 the variable optical delay line is adjusted such that a difference in delay time between the linearly polarized waves propagated through the first arm and the second arm becomes close to $(n+0.5)/f$ where n is an arbitrary integer.

* * * * *